(12) United States Patent
Semple

(10) Patent No.: US 10,330,151 B2
(45) Date of Patent: Jun. 25, 2019

(54) ADDITIVELY MANUFACTURED COMPONENTS FOR DOWNHOLE OPERATIONS

(71) Applicant: Ryan P. Semple, Owasso, OK (US)

(72) Inventor: Ryan P. Semple, Owasso, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/118,737

(22) Filed: Aug. 31, 2018

(65) Prior Publication Data
US 2018/0372155 A1 Dec. 27, 2018

Related U.S. Application Data

(63) Continuation of application No. 15/263,560, filed on Sep. 13, 2016.

(51) Int. Cl.
*F16C 33/04* (2006.01)
*E21B 43/12* (2006.01)
(Continued)

(52) U.S. Cl.
CPC ............ *F16C 33/04* (2013.01); *E21B 43/128* (2013.01); *F16C 1/04* (2013.01); *F16C 27/02* (2013.01);
(Continued)

(58) Field of Classification Search
CPC .... F16C 33/122; F16C 33/124; F16C 33/125; F16C 33/127; F16C 33/128; F16C 33/203;
(Continued)

(56) References Cited

U.S. PATENT DOCUMENTS

| 2,614,896 A | 10/1952 | Brush |
| 3,206,264 A | 9/1965 | Dalzell et al. |

(Continued)

FOREIGN PATENT DOCUMENTS

| JP | 411117940 A | 4/1999 |
| WO | 2006099135 A1 | 9/2006 |
| WO | 2015031544 A1 | 3/2015 |

OTHER PUBLICATIONS

Ertas, Bugra H. "Compliant Hybrid Journal Bearings Using Integral Write Mesh Dampers", Journal of Engineering for Gas Turbines and Power, Mar. 2009, vol. 131; 11 pages.
(Continued)

*Primary Examiner* — Phillip A Johnson
(74) *Attorney, Agent, or Firm* — Cantor Colburn LLP

(57) ABSTRACT

Downhole tools for use in downhole operations and electrical submersible pumping systems having an additively manufactured first part including a first layer having a first predetermined material property and a second layer having a second predetermined material property, wherein the first and second layers are layers of an integral piece and the first predetermined material property is different from the second predetermined material property and a second part configured to rotationally engage with the additively manufactured first part. One of the first part and the second part is rotated relative to the other of the first part and the second part in operation.

13 Claims, 5 Drawing Sheets

(51) Int. Cl.
*F16C 1/04* (2006.01)
*F16C 27/02* (2006.01)
*F16C 33/12* (2006.01)
*F16C 33/20* (2006.01)

(52) U.S. Cl.
CPC .......... *F16C 33/128* (2013.01); *F16C 33/205* (2013.01); *F16C 2220/00* (2013.01); *F16C 2352/00* (2013.01); *F16C 2360/00* (2013.01)

(58) Field of Classification Search
CPC ...... F16C 33/205; F16C 33/74; F16C 33/743; F16C 2360/44; E21B 4/003; E21B 43/128
See application file for complete search history.

(56) References Cited

U.S. PATENT DOCUMENTS

| | | |
|---|---|---|
| 3,382,014 A | 5/1968 | Marley |
| 3,809,443 A | 5/1974 | Cherubim |
| 4,229,054 A | 10/1980 | Miller, Jr. |
| 4,274,683 A | 6/1981 | Gray et al. |
| 4,415,280 A | 11/1983 | Agrawal |
| 4,462,700 A | 7/1984 | Agrawal |
| 4,475,824 A | 10/1984 | Glaser et al. |
| 5,114,244 A | 5/1992 | Dunham et al. |
| 5,160,240 A | 11/1992 | Wilson |
| 6,848,828 B2 | 2/2005 | Nishijima et al. |
| 8,352,821 B2 | 1/2013 | Papasakellariou et al. |
| 9,249,830 B2 * | 2/2016 | Mouri ..................... B22F 5/106 |
| 9,816,519 B2 | 11/2017 | Nowitzi et al. |
| 9,981,284 B2 * | 5/2018 | Guo ....................... B05D 5/083 |
| 2011/0249923 A1 | 10/2011 | Lim et al. |
| 2012/0020592 A1 * | 1/2012 | Schmitt ................... F16C 33/12 384/42 |
| 2012/0285748 A1 | 11/2012 | Kirkhope et al. |
| 2013/0259706 A1 | 10/2013 | Eslinger |
| 2014/0050594 A1 | 2/2014 | Schlenhoff et al. |
| 2014/0127052 A1 | 5/2014 | Knapp |
| 2015/0226219 A1 | 8/2015 | Johnson et al. |
| 2016/0146248 A1 | 5/2016 | Ertas et al. |
| 2017/0045136 A1 | 2/2017 | Taga et al. |
| 2018/0073561 A1 | 3/2018 | Semple |

OTHER PUBLICATIONS

International Search Report, International Application No. PCT/US2017/051127, dated Dec. 20, 2017, Korean Intellectual Property Office; International Search Report 4 pages.

International Written Opinion, International Application No. PCT/US2017/051127, dated Dec. 20, 2017, Korean Intellectual Property Office; International Written Opinion Report 9 pages.

Kohn, Robert V. "Structural Optimization and 3D Printing", Courant Institute, NYU, SIAM CS&E Meeting, Mar. 2015; 21 pages.

* cited by examiner

FIG. 2A
FIG. 2B
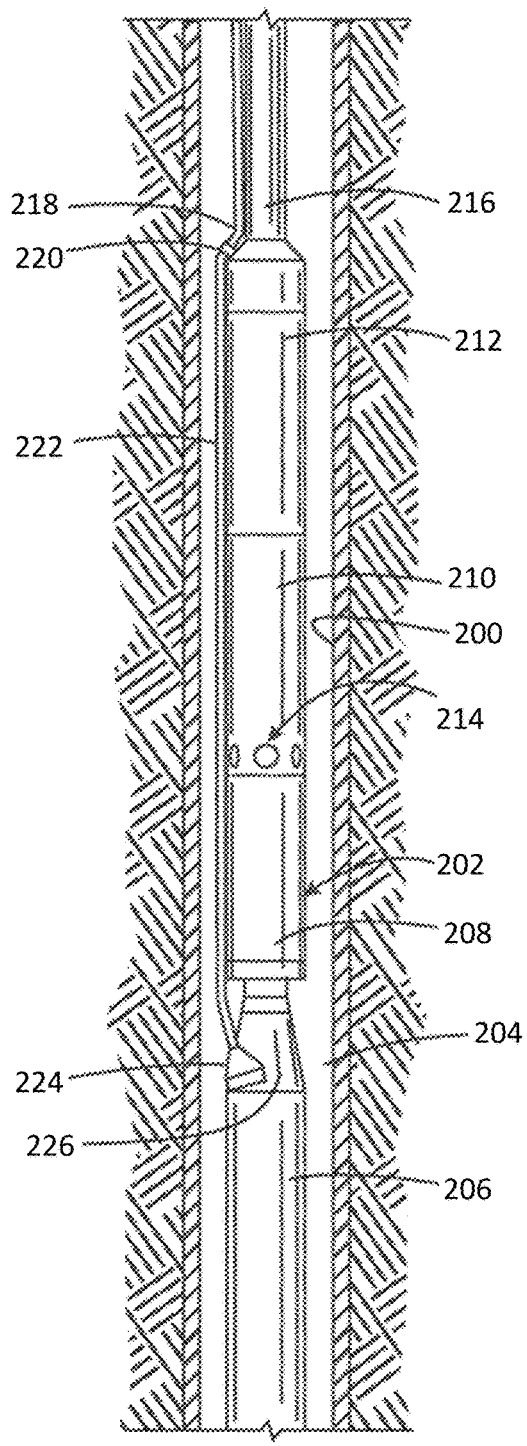
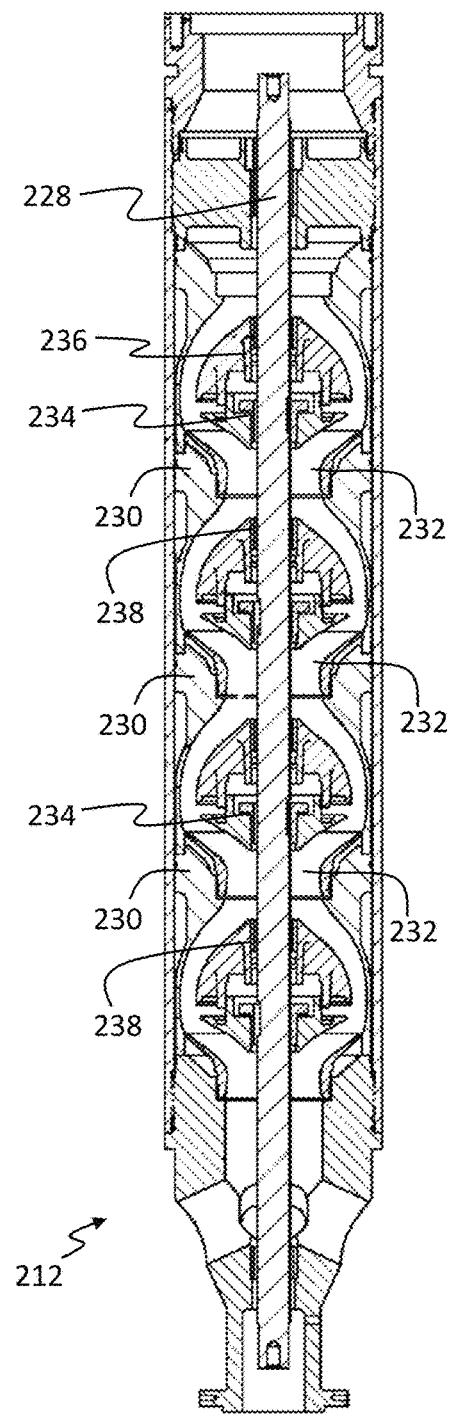

ADDITIVELY MANUFACTURED COMPONENTS FOR DOWNHOLE OPERATIONS

CROSS REFERENCE TO RELATED APPLICATIONS

This application is a continuation of U.S. Non-provisional application Ser. No. 15/263,560, filed on Sep. 13, 2016. The parent application is incorporated by reference herein in its entirety.

BACKGROUND

1. Field of the Invention

The present invention generally relates to components of downhole tools and particularly to optimized components for rotating elements of downhole tools.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

Various components of downhole tools used in boreholes have second parts. Such rotations can cause vibrations within the individual components and/or the vibrations can pass through multiple tools and components of the downhole tools. Vibrations can impact part life, stability, operational parameters, etc. For example, electrical submersible pumping systems may include a large number of stages, each stage having a stationary diffuser and a rotating impeller. The impellers are affixed to a long, flexible driveline which is stabilized by bearings dispersed throughout the assembly. Various forces during operation can impart imbalance within the system that can be detrimental to performance and/or service life. As known in the art, other downhole tool components, including motors, seal sections, etc. can include rotating elements (e.g., rotors) that can cause vibrations. Bushings, bearings, and other mechanisms can be employed to control or minimize vibrations, along with providing other features (e.g., structural support). Control and/or minimization of vibrations within downhole tool components may be advantageous.

SUMMARY

Disclosed herein is are downhole tools for use in downhole operations and electrical submersible pumping systems having an additively manufactured first part including a first layer having a first predetermined material property and a second layer having a second predetermined material property, wherein the first and second layers are layers of an integral piece and the first predetermined material property is different from the second predetermined material property and a second part configured to rotationally engage with the additively manufactured first part. One of the first part and the second part is rotated relative to the other of the first part and the second part in operation.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 2A is an elevational section view of well bore having an electrical submersible pumping system (ESP) disposed therein;

FIG. 2B is an enlarged schematic illustration of an electrical submersible pumping system of FIG. 2A;

DETAILED DESCRIPTION

Disclosed are downhole components optimized and configured to improve operation of downhole tools. Various embodiments of the present disclosure are directed to parts or subparts of components that are additively manufactured such that different layers of the parts or subparts are optimized for specific operational functions or characteristics. For example, in accordance with some embodiments of the present disclosure, components can be configured with optimized stiffness and/or dampening properties without changing the structural aspects of the components. Further, in accordance with various embodiments, a single piece or part can be additively manufactured with first and second layers that form an integral piece, with each layer having different material properties.

Figure 1:
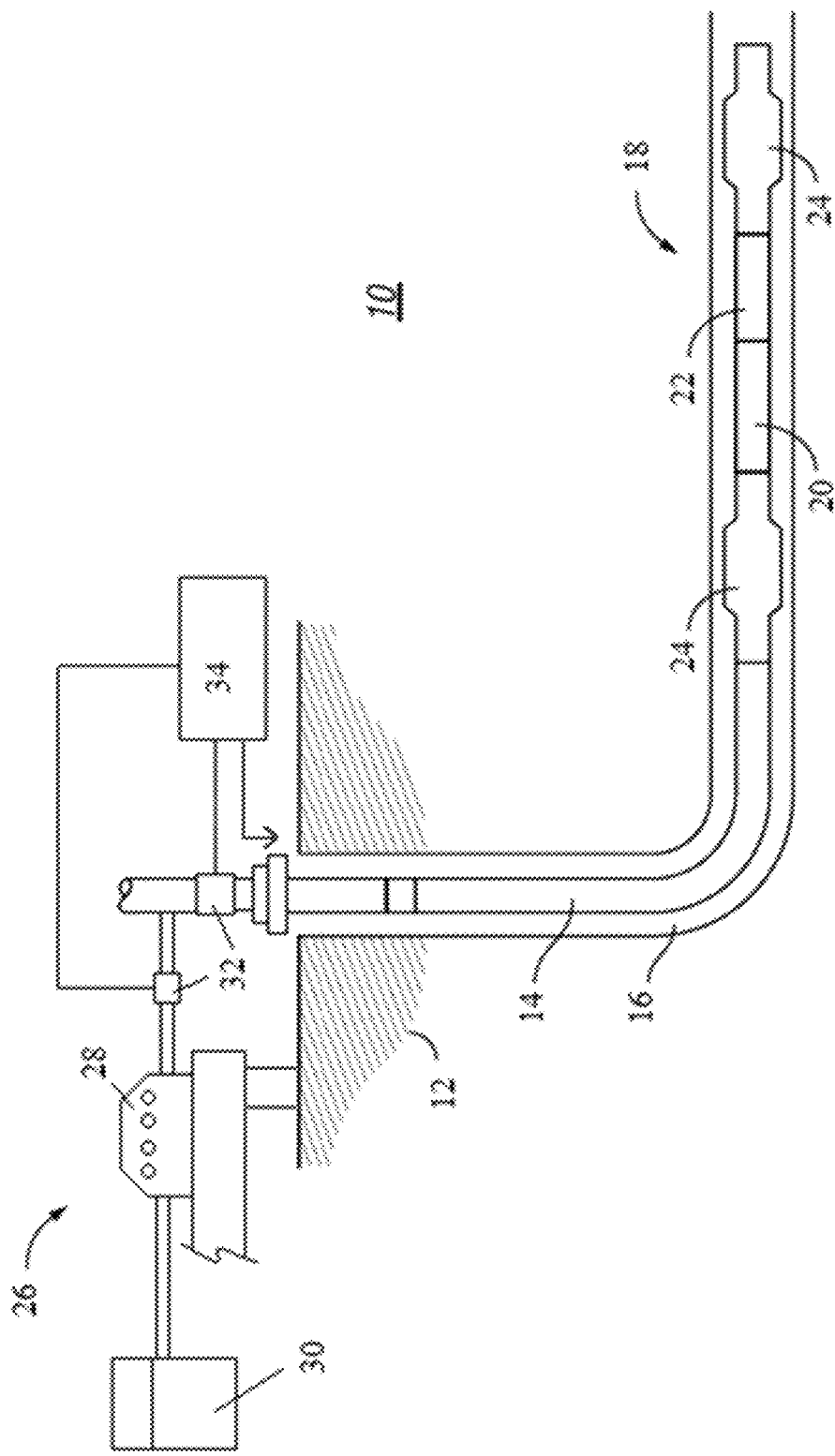
FIG. 1 depicts aspects of a system for formation stimulation and hydrocarbon production that can incorporate embodiments of the present disclosure.

FIG. 1 illustrates aspects of an embodiment of a system 10 for hydrocarbon production and/or evaluation of an earth formation 12. The system 10 includes a borehole string 14 disposed within a borehole 16. The string 14, in one embodiment, includes a plurality of string segments or, in other embodiments, is a continuous conduit such as a coiled tube. As described herein, "string" refers to any structure or carrier suitable for lowering a tool or other component through a borehole or connecting a drill bit to the surface, and is not limited to the structure and configuration described herein. The term "carrier" as used herein means any device, device component, combination of devices, media, and/or member that may be used to convey, house, support, or otherwise facilitate the use of another device, device component, combination of devices, media, and/or member. Example, non-limiting carriers include, but are not limited to, casing pipes, wirelines, wireline sondes, slickline sondes, drop shots, downhole subs, bottomhole assemblies, and drill strings.

In one embodiment, the system 10 is configured as a hydraulic stimulation system. As described herein, "stimulation" may include any injection of a fluid into a formation. A fluid may be any flowable substance such as a liquid or a gas, or a flowable solid such as sand. In such embodiment, the string 14 includes a downhole assembly 18 that includes one or more tools or components to facilitate stimulation of the formation 12. For example, the string 14 includes a fluid assembly 20, such as a fracture or "frac" sleeve device or an electrical submersible pumping system, and a perforation assembly 22. Examples of the perforation assembly 22 include shaped charges, torches, projectiles, and other devices for perforating a borehole wall and/or casing. The string 14 may also include additional components, such as one or more isolation or packer subs 24.

One or more of the downhole assembly 18, the fracturing assembly 20, the perforation assembly 22, and/or the packer subs 24 may include suitable electronics or processors configured to communicate with a surface processing unit and/or control the respective tool or assembly.

A surface system 26 can be provided to extract material (e.g., fluids) from the formation 12 or to inject fluids through the string 14 into the formation 12 for the purpose of fraccing.

As shown, the surface system 26 includes a pumping device 28 in fluid communication with a tank 30. In some embodiments, the pumping device 28 can be used to extract fluid, such as hydrocarbons, from the formation 12, and store the extracted fluid in the tank 30. In other embodiments, the pumping device 28 can be configured to inject fluid from the tank 30 into the string 14 to introduce fluid into the formation 12, for example, to stimulate and/or fracture the formation 12.

One or more flow rate and/or pressure sensors 32, as shown, are disposed in fluid communication with the pumping device 28 and the string 14 for measurement of fluid characteristics. The sensors 32 may be positioned at any suitable location, such as proximate to (e.g., at the discharge output) or within the pumping device 28, at or near a wellhead, or at any other location along the string 14 and/or within the borehole 16.

A processing and/or control unit 34 is disposed in operable communication with the sensors 32, the pumping device 28, and/or the. The processing and/or control unit is configured to receive, store and/or transmit data generated from the sensors 32 and/or the pump 28, and includes processing components configured to analyze data from the pump 28 and the sensors, provide alerts to the pump 28 or other control unit and/or control operational parameters. The processing and/or control unit 34 includes any number of suitable components, such as processors, memory, communication devices and power sources.

Turning now to FIGS. 2A-2B, schematic illustrations of an electrical submersible pumping system (ESP) that can be part of a production system are shown. FIG. 2A is an elevational section view of a well bore 200 having an electrical submersible pumping system (ESP) 202 disposed therein. The space between the outer surfaces of the ESP 202 and the well bore 200 define a well annulus 204. The ESP 202 includes an electric motor 206, a seal/equalizer section 208, an optional separator 210, and a pump section 212. The pump section 212, for example, may comprise a centrifugal pump or a progressing cavity pump. Multiple fluid inlets 214 on the separator 210 can provide a passage for receiving fluid into the ESP 202. Production tubing 216 is coupled to a discharge of the pump for conveying pressurized production fluid from the ESP 202 to the surface. A cable 218 extends downhole and terminates in a connector 220 that electrically couples the cable 218 to a motor lead extension 222. As shown in FIG. 2A, the motor lead extension 222 is a single conductor, but as will be appreciated by those of skill in the art, can be multiple conductors contained within a single sheath or may be some other configuration, assembly, or structure. Further, according to some embodiments, the motor lead extension 222 can be multiple separate conductors. The motor lead extension 222, on its lower terminal end, connects to an external motor connector apparatus 224 that electrically connects and secures the motor lead extension 222 to the motor housing of the motorhead 226 of the electric motor 206. In some non-limiting embodiments, the cable 218 can extend from the surface to the external motor connector 224, thereby eliminating the need for the connector 220.

FIG. 2B is an enlarged schematic illustration a pump section 212 of the electrical submersible pumping system 202. The pump section 212 can be of a multiple stage design, as will be appreciated by those of skill in the art. The pump section 212 includes a shaft 228 extending through a plurality of stage diffusers 230, defining a multistage pump. Each stage diffuser 230 includes an impeller 232 that is fixed to the shaft 228 with a wedge ring retainer 234 (e.g., taper lock). Further, a bushing 238 is configured within each stage diffuser 230, and is configured to enable relative movement between the shaft 228 and a respective stage diffuser 230.

Embodiments provided herein are directed to optimized structural components to be used in downhole operations, and particularly to structural components associated with moving or second parts within downhole systems. Although the below discussion is directed to one non-limiting example (i.e., bushings/bearings for ESP pump sections), those of skill in the art will appreciate the embodiments of the present disclosure can be applicable to any structural component or part used in other components of the ESP or other downhole systems. The following discussion is directed to methods or processes to achieve optimized stiffness and dampening for compliant mount bearings. However, optimization as provided herein can be employed with various other types of structural components, including, but not limited to, any parts of rotating equipment, mud motors, pumps, etc. as will be appreciated by those of skill in the art.

Figure 3A:
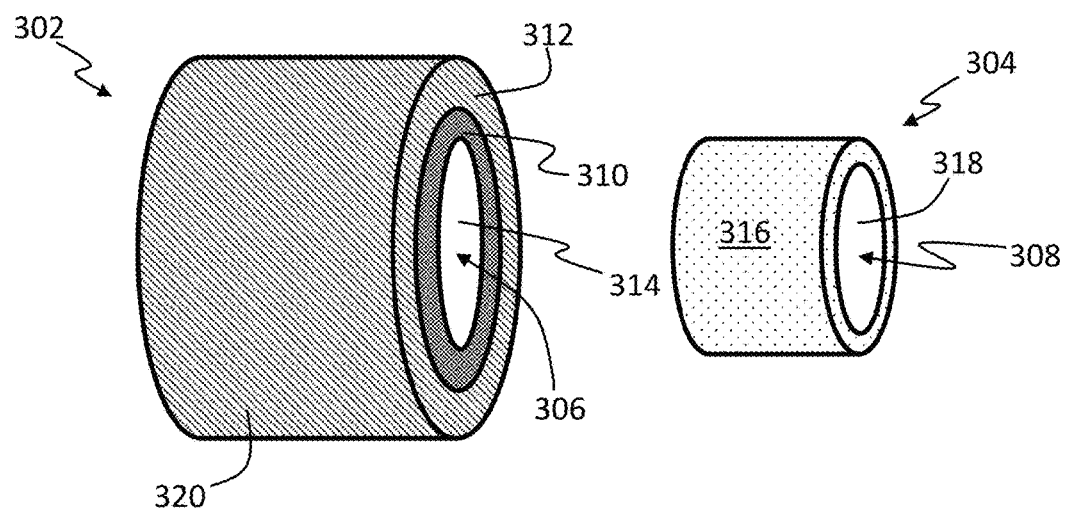
FIG. 3A is an isometric illustration of a structural component in accordance with an embodiment of the present disclosure.
Figure 3B:
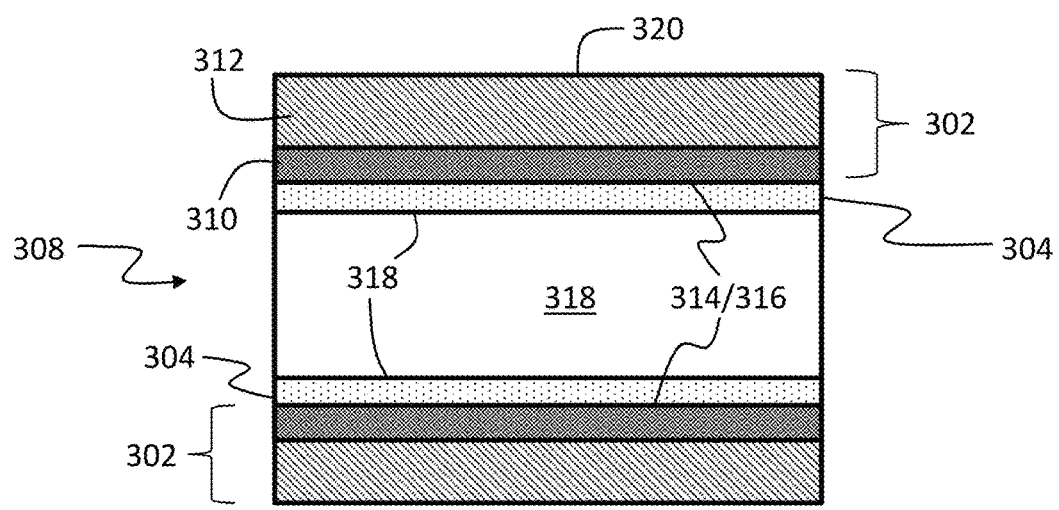
FIG. 3B is a cross-sectional illustration of the structural component of FIG. 3A with a second part of the structural component installed within a first part of the structural component.

Turning to FIGS. 3A-3B, schematic illustrations of a structural component that can employ embodiments of the present disclosure are shown. FIG. 3A is an isometric illustration of a first 302 and a second 304 as separated and FIG. 3B is a cross-sectional illustration of the structural component with the second part 304 installed within the first part 302. The structural component is a component or portion of a component of a downhole tool or system that includes a rotating element or feature of a downhole tool and one or more aspects of the structural component can support such rotation.

In the present non-limiting illustration, the first part 302 receives the second part 304, and the second part 304 can rotate within and with respect to the first part 302. In some non-limiting embodiments, the first part 302 is a bearing housing or bushing and the second part 304 is a bearing or sleeve. In such a configuration, the second part 304 can receive a shaft or other structure that can rotate with the second part 304 by means of a key or other feature. As such, as shown, the first part 302 includes a first aperture 306 that is sized to receive the second part 304 and the second part 304 includes a second aperture 308 that can receive or fit about a shaft or other structure to allow or permit rotation within the structural component. In other embodiments, the first part 302 is a bearing housing that directly contacts the second part 304 which is schematically shown as a portion of a shaft.

FIGS. 3A-3B illustrate that the first part 302 includes an inner layer 310 and an outer layer 312. The inner layer 310 can define a first contact surface 314 that receives and contacts a second contact surface 316 of the second part 304. The first contact surface 314 is an interior surface of the first part 302 and the second contact surface 316 is an exterior surface of the second part 304. Thus, the first and second contact surfaces 314, 316 define an interface between the first part 302 and the second part 304. Further, as shown, the second part 304 includes a support surface 318 on an interior surface thereof. The support surface 318 can be configured to receive and engage with a rotating component, such as a shaft (e.g., shaft 258 of an ESP 202, as shown in FIG. 2B).

Although shown in FIGS. 3A-3B illustratively as two separate layers 310, 312, the layers 310, 312 can be regions of a single structure or piece. In some embodiments, a defined separation or distinct dichotomy may not exist between the two layers 310, 312, as illustratively shown, but rather one layer may transition to the other. That is, in some embodiments, a transition or gradient can exist between the layers 310, 312. Further, in some embodiments, the inner layer 310 and the outer layer 312 can have different material properties, structures, or characteristics, and in some embodiments can be formed from different materials.

Embodiments of the present disclosure are directed to optimizing at least one of the first part 302 or the second part 304. For example, during manufacture, one or both of the first part 302 and the second part 304 can be formed with various structural and/or material properties to optimize operation thereof when installed into a machine or downhole tool. For example, embodiments of the present disclosure can be employed to customize a vibratory response of a structural component, such as a radial journal bearing, by incorporating a specific structural stiffness matrix within one or more parts of the structural component, such as a bearing housing of the radial journal bearing. Furthermore, other advantageous characteristics and optimization can be achieved, such as specific dampening, which can be achieved in a bearing system to optimize the performance of the system by mitigating vibration. Embodiments provided herein can be achieved through additive manufacturing processes wherein specific parts, subparts, regions, layers, etc. can be configured and formed with specific desired properties, including but not limited to, geometry, material properties, physical properties, electrical properties, and/or other characteristics.

Computer simulations can be employed to optimize the design of structural components (e.g., one or both of the rotating and first parts 302, 304), and such optimization can be realized through additive manufacturing techniques for manufacturing and making an end product. For example, an optimized stiffness of a bearing structural component could be determined which provides a desired frequency response of the structural component and/or the overall system in which the additively manufactured structural component is installed. Further, for example, various geometries can be modeled to achieve a desired result for specific operational conditions.

Additionally, through additive manufacturing processes, not only can the geometry of the structural component be customized and optimized, but also the structure and geometry of the material that forms the structural component can be customized and optimized. For example, the material could be additively manufactured into free-form or organic-like structures which can provide advantages over traditional structures and material that is achieved from traditional manufacturing techniques. In one non-limiting embodiments the material of the structural component can be porous and/or have a lattice material structure (e.g., similar to a natural cellular structure (e.g., bone marrow)). Such material structural can be formed integral to one or more aspects of a structural component and have customizable depths of penetration or percentage of total structure. The shape and effective material density can be configured to yield desired characteristics based on modeling or parameters. Further, embodiments provided herein enable tuning of the configuration of individual structural components to meet requirements of various applications (e.g., two similar structural members in a single downhole tool can have different individual structural characteristics based on location and other considerations).

Referring again to FIGS. 3A-3B, in view of the above, it will be appreciated that the structural component (and particularly the first part 302) can be additively manufactured to have different material characteristics for the different inner and outer layers 310, 312 of the first part 302 and/or the material characteristic of the second part 304 can be optimized as desired. That is, the inner and outer layers 310, 312 can be integrally formed into a single piece or part, and not be separate layers that are attached or otherwise fixed together. For example, in one non-limiting embodiment, the first part 302 can be additively manufactured such that the inner layer 310 is formed having a stiffness matrix, e.g., a semi-porous material structure, and the outer layer 312 does not have such matrix but is integrally formed with the inner layer 310. Such stiffness matrix can allow for, for example, optimized vibratory response and absorption and/ or isolation and/or structural stiffness.

As noted, although shown in FIGS. 3A-3B as two distinct layers 310, 312, in some embodiments a gradient of material structure may change from an interior surface toward an exterior surface (e.g., the first contact surface 314 toward an exterior surface 320 of the first part 302). That is, a porosity and/or density of material can be variable as a depth of material changes. For example, at a surface, the layer may be porous and have a relatively low density and as the depth of material increases (e.g., transitioning through the inner layer 310 to the exterior surface 320 of the outer layer 312) the porosity may go down and the density may increase.

Accordingly, in one non-limiting example, with reference to FIGS. 3A-3B, the inner layer 310 of the first part 302 can have a first predetermined material property (e.g., structure, density, porosity, chemical composition, etc.) and the outer layer 312 of the first part 302 can have a second predetermined material property that is different from the first predetermined material property. The first and second predetermined material properties can be selected to achieve various operational characteristics of the first part 302. For example, a relatively low density predetermined material property can be provided at the inner layer 310 to improve or optimize vibration dampening and a higher density predetermined material property can be provided at the outer layer 312 to optimize stiffness and/or rigidity of the first part 302.

As noted above, in some embodiments, the second part 304 can be a part that is inserted into the first part 302. In some such configurations the first part 302 is a bearing housing that is additively manufactured with multiple layers and the second part 304 is a shaft that is in direct contact with an interior surface of the first part 302. That is, the second part 304 shown in FIGS. 3A-3B can be a section of a rotating shaft that rotates within a bearing housing. The second contact surface 316 is an exterior surface of the shaft and is in direct contact with a bore of the bearing housing (e.g., first contact surface 314 of the first part 302).

In another configuration, the structural component can be part of a system having a bearing housing and a bushing that fits therein. The bushing can be additively manufactured as a single piece having multiple layers, as described above. That is, the bushing of such embodiment is the first part 302 which is housed within a separate bearing housing, not shown but readily appreciated by those of skill in the art. The first part 302 of this configuration can be press fit or otherwise inserted into the bearing housing. A shaft (e.g., second part 304) can fit within and is in direct contact with a bore of the bushing (e.g., the first contract surface 314 of the first part 302).

In another configuration, the first part 302 can be a bearing housing that is additively manufactured having multiple layers, as described above. A sleeve (e.g., second part 304) can be inserted within the first part 302, and a shaft can be inserted into the second aperture 308 of the second part 304, as described above. The sleeve can be fixedly attached to the shaft through a key/keyway, as will be appreciated by those of skill in the art.

In another configuration, the rotating part, not the stationary part, can be additively manufactured. For example, in one non-limiting example, a stationary bearing housing can be manufactured by traditional means and a rotating shaft (e.g., second part 304) can be disposed within the stationary bearing housing. In this embodiment, a sleeve (e.g., first part 302) that is additively manufactured with multiple integral layers can be fit between the stationary bearing housing and the rotating shaft (e.g., second part 304). An exterior surface of the first part 302 (e.g., exterior surface 320) can be in direct contact with a bore or interior surface of the bearing housing, and the sleeve (e.g., first part 302) is slid over the outer diameter of the shaft and in direct contact with the shaft (e.g., second contact surface 316). In such an embodiment, the first part 302 can include a keyway for fixed engagement with the shaft/second part 304.

In another configuration, a stationary bearing housing can contain or house a stationary bushing. A rotating shaft (e.g., second part 304) can pass through an aperture within the bushing. A rotating sleeve (e.g., first part 302) that is additively manufactured with multiple layers can be positioned between the rotating shaft and the bushing. The sleeve can be coupled to the shaft through a key/keyway as will be appreciated by those of skill in the art.

Although a limited number of examples are described above, those of skill in the art will appreciate that additively manufactured components as described herein can be employed in a multitude of different configurations and applications. Thus, the present disclosure is not intended to be limited to the above embodiments, but rather they are presented for illustrative and explanatory purposes.

Figure 4:
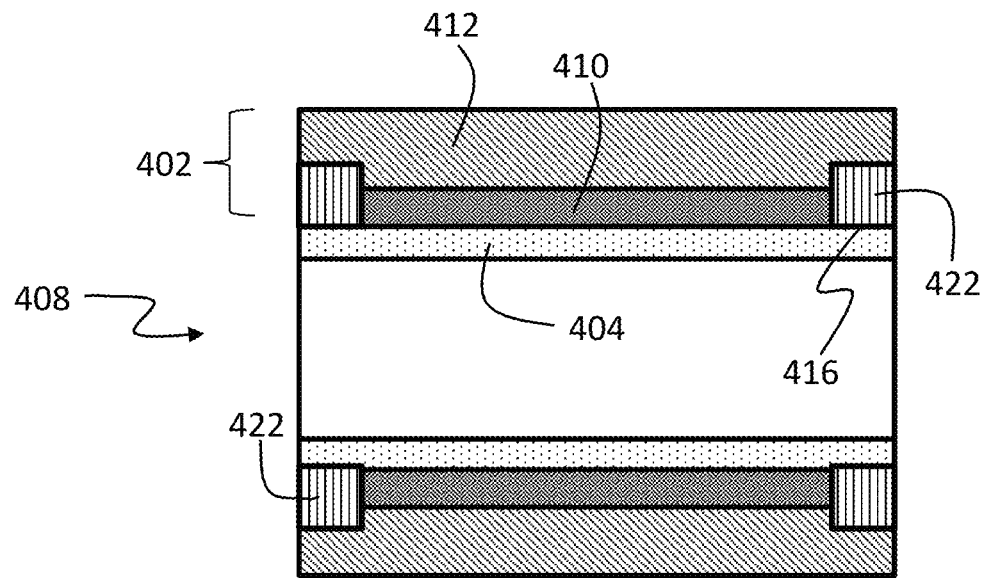
FIG. 4 is schematic illustration of another structural component in accordance with an embodiment of the present disclosure.

Turning now to FIG. 4, a configuration of a structural component in accordance with the present disclosure is shown. The structural component is similar to that shown in FIGS. 3A-3B and thus like features will not be discussed again. However, as shown in FIG. 4, the structural component can incorporate desired geometries at the component level (in addition geometries at the material level, as discussed above). As shown, the structural component includes a first part 402 and a second part 404 similar to that described above. The first part 402 includes an inner layer 410 and an outer layer 412. In this embodiment, the inner layer 410, which may be porous or have a low density, can be injected with a fluid to increase a dampening function of the structural component. The fluid can be a predetermined viscous dampening fluid that is pre-injected into the inner layer 410. The fluid can fill the voids, cavities, pores, matrix, lattice structure, etc. of the inner layer 410. In such a configuration, the structural component can include optional seals 422 that are configured to engage with the first part 402 to seal the fluid within the first layer 410. That is, as shown, the seals 422 can fluidly seal against the second layer 412 and the second contact surface 416 of the second part 404 to define a sealed volume within the inner layer 410. To accommodate the option seals 422, the inner and outer layers 410, 412 of the first part 402 can be formed with unique geometries.

Figure 5:
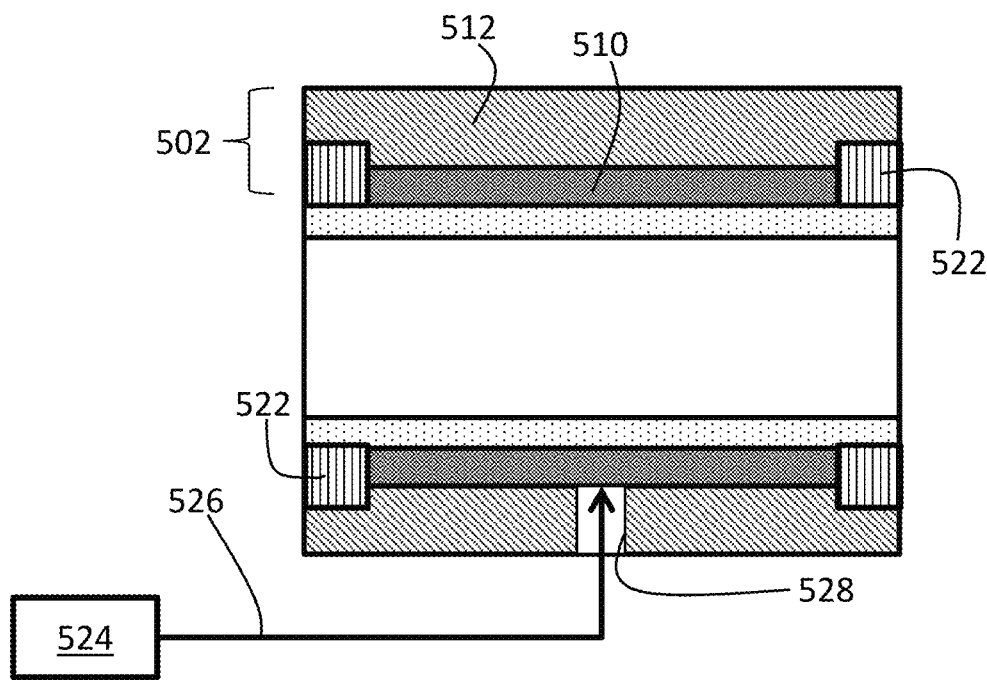
FIG. 5 is a schematic illustration of another structural component in accordance with an embodiment of the present disclosure.

Turning now to FIG. 5, another configuration implementing a fluidly sealed portion of a structural component is shown. The structural component is similar to the structural component of FIG. 4 and includes seals 522. However, as shown, the structural component can be operably connected to a pressure control system 524. The pressure control system 524 can include a controller (e.g., processor, microcontroller, etc.), a pump, a pressure regulated fluid supply, etc. as will be appreciated by those of skill in the art. The pressure control system 524 can be operably connected to the structural component through a fluid conduit 526, with the fluid conduit 526 passing through a pressure control aperture 528 that extends through the outer layer 512 of the first part 502 to the inner layer 510. The pressure control aperture 528 and/or the fluid conduit 526 (or a portion thereof) can be additively manufactured with and as part of the structural component.

Although described above with the first part having the first and second layers, those of skill in the art will appreciate that such configuration and structure can be applied to the second part, and/or to both the first and second parts. Thus, the above description is not intended to be limited to the shown and described embodiments. For example, in one non-limiting example, an exterior surface (e.g., second contact surface 316) of the second part can be formed as a first layer and an interior layer (e.g., support surface) can be formed as a second layer having a different predetermined material property than the first (outer) layer of the second part. In such a configuration, the first part may be formed with or without multiple layers.

Figure 6:
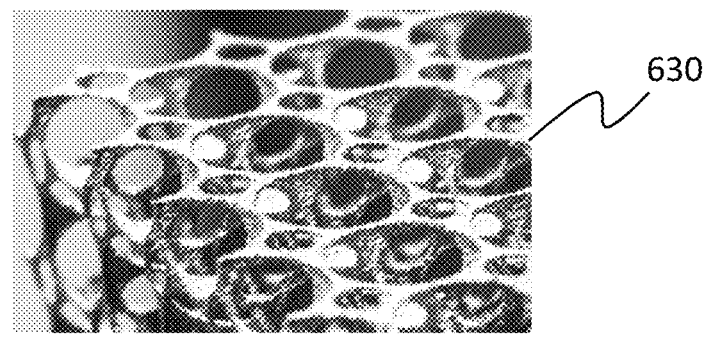
FIG. 6 illustrates various predetermined material properties as employed in various embodiments over the present disclosure.
Figure 6:
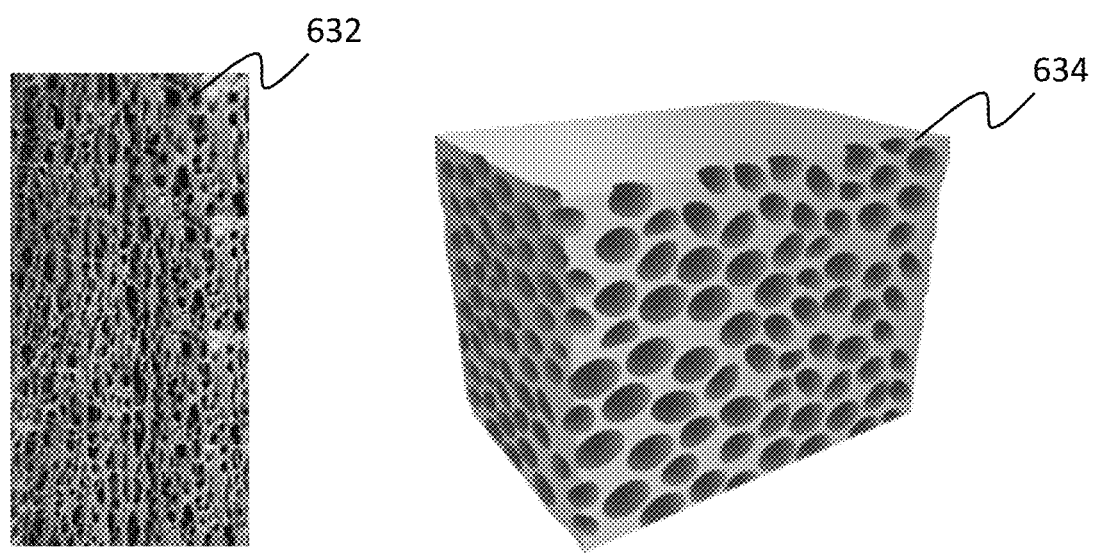

Turning now to FIG. 6, example predetermined material properties that can be employed and formed through additive manufacturing in accordance with the present disclosure are shown. A predetermined material property 630 is shown having a matric or lattice structure that may be relatively porous and have a low density. A predetermined material property 632 is shown having a cellular structure with elongated pores or cavities, and may be relatively denser than the predetermined material property 630. Finally, the predetermined material property 634 illustrates a predetermined material property with a porous exterior and a solid interior. Each of the predetermined material properties 630, 632, 634 and variations thereon can be used to form the first layer as described above. Further, the different predetermined material properties can be all used within a single structural component. For example, a density can increase from an interior contact surface toward a solid material at an exterior surface. The selection of the various predetermined material properties can be used to optimize operational functionality of the structural component. Further, similar optimization can be used with respect to predetermined material property depth, material selection for various layers, geometry, etc.

Such selection and optimization can be used to provide additional refinements/optimization based on vibratory responses, electromagnet responses, etc. by determining or modeling specific operational conditions that will be experienced by the structural component. Accordingly, as provided herein, various embodiments enable optimization of structural components with specific desired characteristics. Further, advantageously, a reduction in part cost can be achieved through material use/cost reduction due to the printing nature of additive manufacturing.

Embodiment 1

A downhole tool for use in downhole operations, the downhole tool comprising: an additively manufactured first part including a first layer having a first predetermined material property and a second layer having a second predetermined material property, wherein the first and second layers are layers of an integral piece and the first predetermined material property is different from the second predetermined material property; and a second part configured to rotationally engage with the additively manufactured first part, wherein one of the first part and the second part is rotated relative to the other of the first part and the second part in operation.

Embodiment 2

A downhole tool according to any of the present embodiments, wherein the second part is installed within the first part.

Embodiment 3

A downhole tool according to any of the present embodiments, wherein the first part is a stationary bearing housing of an electrical submersible pumping system and the second part is a shaft of the electrical submersible pumping system.

Embodiment 4

A downhole tool according to any of the present embodiments, wherein the first part is a stationary bushing, and the second part is a rotating shaft, the downhole tool further comprising a bearing housing, wherein the bushing is housed within the bearing housing.

Embodiment 5

A downhole tool according to any of the present embodiments, wherein the first part is a stationary bearing housing and the second part is a shaft that rotates within the stationary bearing, the downhole tool further comprising a sleeve that is fixedly connected to the shaft and disposed between stationary bearing housing and the shaft.

Embodiment 6

A downhole tool according to any of the present embodiments, wherein the first part is a rotating sleeve and the second part is a rotating shaft, wherein the first part is fixedly connected to the second part, the downhole tool further comprising a stationary bearing housing that supports the first part and the second part.

Embodiment 7

A downhole tool according to any of the present embodiments, wherein the first part is fixedly connected to the second part, the downhole tool further comprising a stationary bearing housing and a stationary bushing within the bearing housing, wherein the bearing housing and the bushing support the first part and the second part.

Embodiment 8

A downhole tool according to any of the present embodiments, wherein the first predetermined material property has a lower density than the second predetermined material property.

Embodiment 9

A downhole tool according to any of the present embodiments, wherein the first predetermined material property has at least one of voids, cavities, pores, matrix structure, or lattice structure.

Embodiment 10

A downhole tool according to any of the present embodiments, wherein a gradient exists between the first layer and the second layer such that a material of the additively manufactured first part includes a transition from the first predetermined material property to the second predetermined material property.

Embodiment 11

A downhole tool according to any of the present embodiments, further comprising at least one seal configured to define a sealed volume within the second layer of the first part, the sealed volume bounded by the at least one seal, the second layer, and the second part.

Embodiment 12

A downhole tool according to any of the present embodiments, further comprising a pressurized fluid within the first layer of the first part.

Embodiment 13

A downhole tool according to any of the present embodiments, further comprising at least one seal configured to define a sealed volume within the second layer of the first part, the sealed volume bounded by the at least one seal, the second layer, and the second part, wherein the pressurized fluid is contained within the sealed volume.

Embodiment 14

A downhole tool according to any of the present embodiments, further comprising a pressure control system fluidly connected to the first layer, wherein the pressure control system is configured to control a fluid pressure of the pressurized fluid within the first layer.

Embodiment 15

A downhole tool according to any of the present embodiments, wherein the pressure control system includes a fluid conduit that passes through a pressure control aperture of the second layer to fluidly connect a fluid supply with the first layer.

Embodiment 16

An electrical submersible pumping system comprising: an additively manufactured first part including a first layer having a first predetermined material property and a second layer having a second predetermined material property, wherein the first and second layers are layers of an integral piece and the first predetermined material property is different from the second predetermined material property; and a second part configured to rotationally engage with the additively manufactured first part, wherein one of the first part and the second part is rotated relative to the other of the first part and the second part in operation.

Embodiment 17

An electrical submersible pumping system according to any of the present embodiments, wherein the first predetermined material property has a lower density and the second predetermined material property.

Embodiment 18

An electrical submersible pumping system according to any of the present embodiments, wherein the first predetermined material property has at least one of voids, cavities, pores, matrix structure, or lattice structure.

Embodiment 19

An electrical submersible pumping system according to any of the present embodiments, wherein a gradient exists between the first layer and the second layer such that a material of the additively manufactured first part includes a transition from the first predetermined material property to the second predetermined material property.

Embodiment 20

An electrical submersible pumping system according to any of the present embodiments, further comprising at least one seal configured to define a sealed volume within the second layer of the first part, the sealed volume bounded by the at least one seal, the second layer, and the second part and a pressurized fluid within the first layer of the first part.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A downhole electrical submersible pumping system comprising:
   an electric motor;
   a seal section; and
   a pump section having a bearing system, the bearing system comprising a bearing having:
   an additively manufactured bearing housing being a single piece having a first predetermined material property at an interior surface and a second predetermined material property at an exterior surface, wherein a material property of the bearing housing transitions from the first predetermined material property at the interior surface to the second predetermined material property at the exterior surface in a radial direction and the first predetermined material property is different from the second predetermined material property; and
   a shaft configured to rotationally engage with the additively manufactured bearing housing.

2. The downhole electrical submersible pumping system of claim 1, wherein the shaft is installed within the bearing housing.

3. The downhole electrical submersible pumping system of claim 1, further comprising stationary bushing housed within the bearing housing.

4. The downhole electrical submersible pumping system of claim 1, further comprising a sleeve that is fixedly connected to the shaft and disposed between bearing housing and the shaft.

5. The downhole electrical submersible pumping system of claim 1, wherein the bearing housing is configured to fixably connect to the shaft by a keyway such that the bearing housing and the shaft are rotatable together when fixedly connected by the keyway, the electrical submersible pumping system further comprising a stationary bearing housing that supports the bearing housing and the shaft.

6. The downhole electrical submersible pumping system of claim 1, wherein the first predetermined material property has a lower density than the second predetermined material property.

7. The downhole electrical submersible pumping system of claim 1, wherein the first predetermined material property has at least one of voids, cavities, pores, matrix structure, or lattice structure.

8. The downhole electrical submersible pumping system of claim 1, wherein the transition from the interior surface to the exterior surface is a gradient transition such that a material of the additively manufactured bearing housing includes a transition from the first predetermined material property to the second predetermined material property.

9. The downhole electrical submersible pumping system of claim 1, wherein the bearing housing further comprises at least one seal configured to define a sealed volume within the bearing housing, the sealed volume bounded by the at least one seal, the a portion of the bearing housing, and the shaft.

10. The downhole electrical submersible pumping system of claim 1, further comprising a pressurized fluid within the bearing housing.

11. The downhole electrical submersible pumping system of claim 10, further comprising at least one seal configured to define a sealed volume within the bearing housing, the sealed volume bounded by the at least one seal, the a portion of the bearing housing, and the shaft, wherein the pressurized fluid is contained within the sealed volume.

12. The downhole electrical submersible pumping system of claim 11, further comprising a pressure control system fluidly connected to the sealed volume, wherein the pressure control system is configured to control a fluid pressure of the pressurized fluid within the sealed volume.

13. The downhole electrical submersible pumping system of claim 12, wherein the pressure control system includes a fluid conduit that passes through a pressure control aperture to fluidly connect to the sealed volume.

* * * * *